United States Patent
Xu et al.

(10) Patent No.: US 10,374,896 B2
(45) Date of Patent: *Aug. 6, 2019

(54) SYSTEM AND METHOD FOR AUTOMATICALLY DETECTING AND CONFIGURING SERVER UPLINK NETWORK INTERFACE

(71) Applicant: Cisco Technology, Inc., San Jose, CA (US)

(72) Inventors: Milton Y. Xu, San Jose, CA (US); Padmanabhan Krishnan, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/796,020

(22) Filed: Oct. 27, 2017

(65) Prior Publication Data

US 2018/0069757 A1    Mar. 8, 2018

Related U.S. Application Data

(63) Continuation of application No. 14/660,746, filed on Mar. 17, 2015, now Pat. No. 9,806,950.

(Continued)

(51) Int. Cl.
*H04L 12/24* (2006.01)

(52) U.S. Cl.
CPC ........ *H04L 41/0886* (2013.01); *H04L 41/085* (2013.01); *H04L 41/0806* (2013.01);

(Continued)

(58) Field of Classification Search
CPC ............ H04L 41/0886; H04L 41/0809; H04L 41/085; H04L 41/0806; Y02B 60/44; Y02B 60/43

See application file for complete search history.

(56) References Cited

U.S. PATENT DOCUMENTS

| | | |
|---|---|---|
| 8,521,890 B2 | 8/2013 | Bailey et al. |
| 8,630,173 B2 | 1/2014 | Sundar et al. |

(Continued)

FOREIGN PATENT DOCUMENTS

| | | |
|---|---|---|
| EP | 2779531 | 9/2014 |
| WO | 2014015715 | 1/2014 |

OTHER PUBLICATIONS

Renato et al., "Ethernet Virtual Bridging Automation Use Cases," 22nd International Tele-Traffic congress (paper and presentation) Sep. 2010.

(Continued)

*Primary Examiner* — Rina C Pancholi
(74) *Attorney, Agent, or Firm* — Polsinelli PC (57) ABSTRACT

A system and a method for automatically detecting and configuring server uplink network interfaces in a network environment. An exemplary method includes receiving a discovery packet from a network element on a network interface of a server connected to the network element; evaluating the discovery packet to determine whether the network element possesses virtual bridging capabilities; and configuring the network interface of the server as an uplink interface for communicating with a network when the discovery packet indicates that the network element possesses virtual bridging capabilities.

20 Claims, 3 Drawing Sheets

Related U.S. Application Data (60) Provisional application No. 62/121,347, filed on Feb. 26, 2015.

(52) U.S. Cl.
CPC .......... H04L 41/0809 (2013.01); *Y02D 30/30* (2018.01); *Y02D 30/32* (2018.01)

(56) References Cited

U.S. PATENT DOCUMENTS

| | | |
|---|---|---|
| 8,639,783 B1 | 1/2014 | Bakke et al. |
| 2010/0238808 A1 | 9/2010 | Salam |
| 2011/0283278 A1 | 11/2011 | Murrell et al. |
| 2012/0063363 A1 | 3/2012 | Li |
| 2012/0063466 A1* | 3/2012 | Sultan ................. H04L 12/4645 370/401 |
| 2013/0046892 A1 | 2/2013 | Otani |
| 2013/0336134 A1* | 12/2013 | Bao ...................... H04L 41/046 370/252 |
| 2014/0006585 A1 | 1/2014 | Dunbar |
| 2014/0036675 A1 | 2/2014 | Wang et al. |
| 2014/0226523 A1 | 8/2014 | Deshpande |
| 2014/0280846 A1* | 9/2014 | Gourlay ................. H04L 41/00 709/223 |
| 2014/0297889 A1 | 10/2014 | Dong |
| 2014/0359620 A1 | 12/2014 | Van Kerkwyk et al. |
| 2015/0110105 A1* | 4/2015 | Kapur ................... H04L 45/245 370/389 |
| 2015/0172126 A1* | 6/2015 | Xiao ................... H04L 12/4625 370/254 |
| 2015/0280992 A1* | 10/2015 | Wang ................. H04L 41/0886 370/254 |

OTHER PUBLICATIONS

International Search Report and Written Opinion from International Application Serial No. PCT/US2016/018503 dated May 13, 2016.

* cited by examiner

SYSTEM AND METHOD FOR AUTOMATICALLY DETECTING AND CONFIGURING SERVER UPLINK NETWORK INTERFACE

CROSS-REFERENCE TO RELATED APPLICATION

This application is a continuation of, and claims the benefit of priority to, U.S. patent application Ser. No. 14/660,746 filed Mar. 17, 2015, entitled "SYSTEM AND METHOD FOR AUTOMATICALLY DETECTING AND CONFIGURING SERVER UPLINK NETWORK INTERFACE," which claims the benefit of priority under 35 U.S.C. § 119(e) to U.S. Provisional Application Ser. No. 62/121,347 entitled "SYSTEM AND METHOD FOR AUTOMATICALLY DETECTING SERVER UPLINK NETWORK INTERFACE," filed Feb. 26, 2015, which are hereby incorporated by reference in their entireties.

TECHNICAL FIELD

This disclosure relates in general to the field of communications and, more particularly, to a system and a method for automatically detecting and configuring server uplink network interfaces in a network environment.

BACKGROUND

Data centers are increasingly used by enterprises to achieve collaboration, store data, manage resources, etc. A typical data center network contains myriad network elements. The network connecting the network elements provides secure user access to data center services and an infrastructure for deployment, interconnection, and aggregation of shared resource as required, including applications, servers, appliances, and storage. Today's data centers often look to cloud computing for meeting such demands, which can enable network access to a shared pool of configurable computing resources (e.g., networks, applications, servers, and storage) that can be rapidly provisioned and released with minimal management effort. Improving operational efficiency and optimizing utilization of data center resources are some of the challenges facing data center managers. Data center managers want a resilient infrastructure that consistently supports diverse applications and services and protects the applications and services against disruptions. A properly planned and operating data center network provides application and data integrity and, further, optimizes application availability and performance.

BRIEF DESCRIPTION OF DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A system and a method for method for automatically detecting and configuring server uplink network interfaces in a network environment. An exemplary method includes receiving a discovery packet from a network element on a network interface of a server connected to the network element; evaluating the discovery packet to determine whether the network element possesses virtual bridging capabilities; and configuring the network interface of the server as an uplink interface for communicating with a network when the discovery packet indicates that the network element possesses virtual bridging capabilities. The method can further include forwarding network traffic from a virtual machine running on the server via the uplink interface to the network. The method may further include, upon detecting that the uplink interface for communicating with the network is broken, automatically reconfiguring the uplink interface for the server connected with the network element. The uplink interface may be automatically reconfigured when the server is re-connected to the network element.

In various implementations, the network interface of the server is configured as the uplink interface when the discovery packet indicates that the network element supports virtual station interface (VSI) Discovery and Configuration Protocol (VDP). The discovery packet may be a link layer discovery protocol (LLDP) packet, and evaluating the discovery packet may include evaluating an Ethernet Virtual Bridging (EVB) Type-Length-Value (TLV) of the LLDP packet. In such embodiment, the network interface of the server is configured as the uplink interface when the EVB TLV indicates that the network element is an EVB Bridge. In various implementations, the network element is a switch, the method further comprising receiving the discovery packet upon connecting the network interface of the server to the switch. The uplink interface may be associated with a physical port of the server attached to the switch, or a logical port of the server attached to the switch.

Example Embodiments

Figure 1:
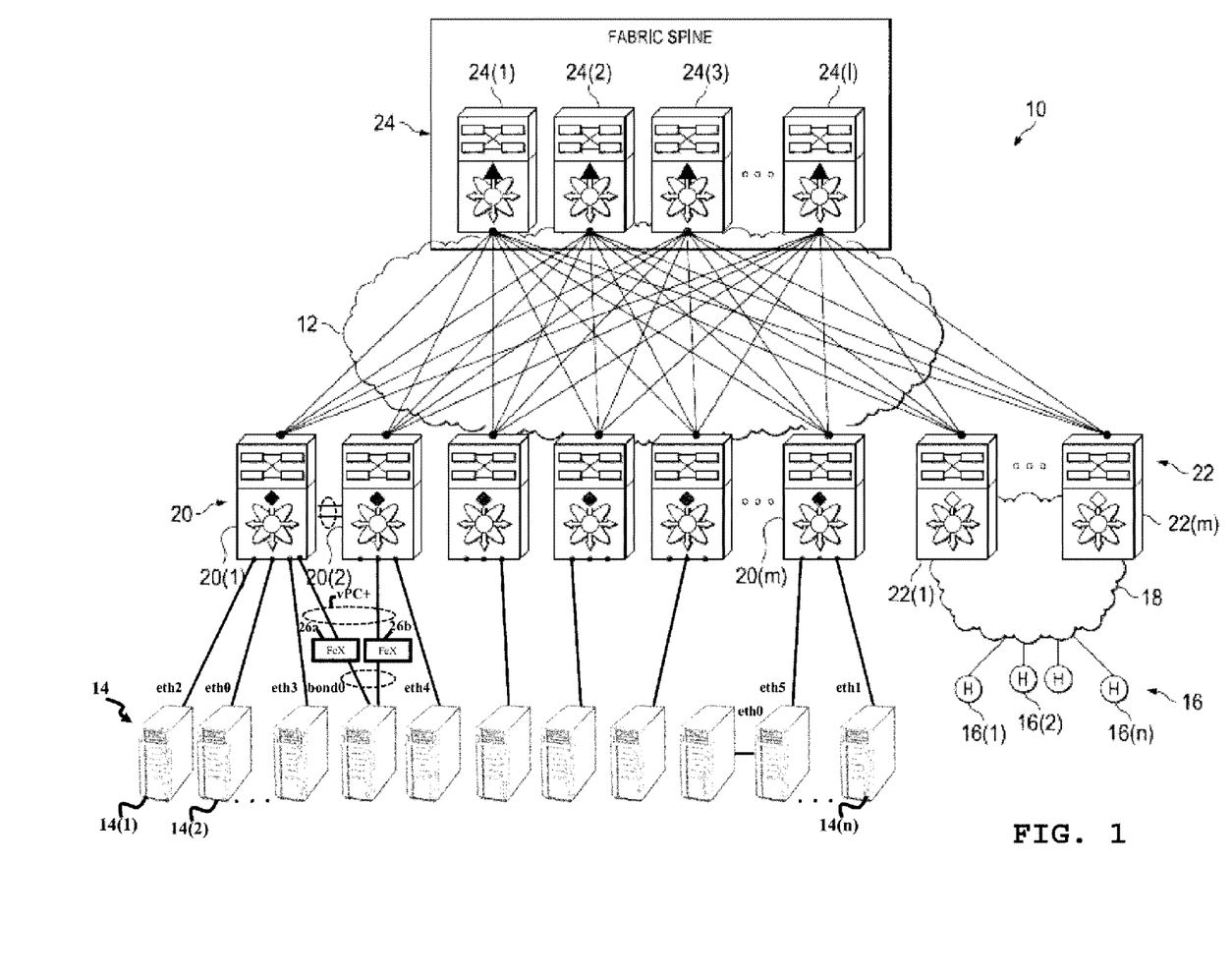
FIG. 1 is a simplified schematic block diagram illustrating a communication system for automatically detecting server uplink network interfaces in a network environment, such as a cloud computing environment, in accordance with various embodiments.

FIG. 1 is a simplified schematic block diagram illustrating a communication system 10 for automatically detecting and configuring server uplink network interfaces in a network environment. In FIG. 1, communication system 10 includes a network 12 (generally shown as various links) that interconnect hosts 14(1), 14(2), . . . , and 14(n) (generally referred to as hosts 14) and external hosts 16(1), 16(2), . . . , and 16(N) (generally referred to as external hosts 16), where n represents a total number of hosts 14 and N represents a total number of external hosts 16. External hosts 16 connect to network 12 over an external network 18. In various embodiments, network 12 represents a network fabric that provides a multistage, switching network in which every connected host (e.g., hosts 14) is reachable through a same number of hops. In various embodiments, network 12 can include overlay architecture, such as that provided in Transparent Interconnect of Lots of Links (TRILL) networks and Cisco® FabricPath. In various embodiments, communication system 10 can deploy Cisco® Dynamic Fabric Automation (DFA) for configuring network 12, which can optimize a networking environment through superior integration. In various implementations, network 12 is a data center network that deploys Cisco® DFA, providing a next generation data center architecture that offers scalability and multi-tenancy, along with orchestration simplicity. Network 12 can communicate with a cloud over external network 18 to form a hybrid network cloud environment. The cloud may be a collection of hardware and software ("cloud infrastructure") forming a shared pool of configurable network resources (for example, networks, servers, storage, applications, services, etc.) that can be suitably provisioned to provide on-demand self-service, network access, resource pooling, elasticity and measured service, among other features.

Hosts 14 can communicate (for example, by receiving/forwarding packets) with each other over network 12, and hosts 14 can communicate (for example, by receiving/forwarding packets) with external hosts 16 connected to network 12 over external network 18. As used herein, the term "host" may include any network element, physical or virtual, connected to other network elements over a network. Hosts may provide data and other services to network elements. In a client-server model, hosts may include servers. In a peer-to-peer network, each computer may be a host. Hosts may also include computers participating in networks that use Internet Protocol (IP). In a general sense, each host has a specific, unique address (e.g., IP address) associated therewith. Hosts can include physical machines (for example, servers) and virtual machines (VMs). Further, the term "external host" may include any host connected to a network (e.g., network 12) over an external network (e.g., external network 18).

Network 12 includes various network nodes configured to perform spine/leaf roles, enabling a scale-out network model for optimizing growth of communication system 10—leaf switches 20(1), 20(2), . . . , and 20(m) (generally referred to as leaf switches 20) that connect hosts 14 to network 12, where m is a total number of leaf switches 20; border leaf switches 22(1), 22(2), . . . , and 22(M) (generally referred to as border leaf switches 22) that connect external hosts 16 to network 12, where M is a total number of border leaf switches 22; and spine switches 24(1), 24(2), . . . , and 24(j) (collectively referred to as a fabric spine 24 of network 12) that connect leaf switches 20 and/or border leaf switches 22 to one another, where j is a total number of spine switches of fabric spine 24. Leaf switches 20, border leaf switches 22, and spine switches can connect to network 12 via network interfaces (depicted as shaded circles), such as ports through which leaf switches 20, border leaf switches 22, and/or spine switches connect to one another. Leaf switches 20 can include host interfaces (depicted as unshaded circles), for example, ports through which hosts 14 connect to leaf switches 20, such that leaf switches 20 can forward packets between hosts 14 over network 12. In various embodiments, each leaf switch 20 can serve as a Top-Of-Rack (ToR) switch of a respective rack unit in a data center network environment, where network 12 serves as a data center network. Border leaf switches 22 can connect to external network 18 via another network interface (not depicted), such that border leaf switches 22 can forward packets between hosts 14 and external hosts 16 over network 12. External network 18 can be the Internet, a wide area network (WAN), a data center interconnect (DCI), other appropriate network, or any combination thereof. In various embodiments, network 12 can flexibly interconnect with other networks over external network 18 via border leaf switches 22. Fabric spine 24 can forward packets between leaf switches 20 and/or border leaf switches 22, enabling a single tier network fabric in various embodiments. In some network topologies, fabric spine 24 can include one level of switches (such as a 2-tier fat tree topology); and in other network topologies, fabric spine 24 can include multiple levels of switches (such as a 3-tier fat tree topology). Virtually any number of switches may be used in network 12 depending on network topology considerations for communication system 10.

In FIG. 1, each host 14 has an associated physical network interface connecting it to a respective leaf switch 20, providing each host with connectivity to external network 18 and other hosts 14 within network 12. The physical network interfaces can represent uplink network interfaces (also referred to as uplinks or uplink ports) that connect one or more virtual machines to network 12, as described further below. In the depicted embodiment, physical network interfaces are depicted as Ethernet interfaces, such as eth0, eth1, eth2, eth 3, eth 4, eth5, and so on. Each Ethernet interface may include one or more Ethernet ports, which can physically connect its associated host to a respective leaf switch 20. Physical network interfaces can be aggregated to create a logical network interface (a logical port channel), such as an EtherChannel In the depicted embodiment, physical network interfaces from one of the hosts 14 are aggregated to form a logical network interface connecting the host 14 to leaf switch 20(1) and leaf switch 20(2), for example, by using a network fabric extender (FeX) 26a and a network fabric extender 26b. In various implementations, a virtual PortChannel (vPC) can enable physical network interfaces connected to different switches to appear as a logical physical network interface (for example, a single PortChannel) to other network elements, such as a switch, a network fabric extender, a server, or any other network element. For example, a vPC is created between network fabric extender (FeX) 26a and network fabric extender 26b.

As used herein, the term "switch" includes any network element configured to receive packets from a source (e.g., host 14(1)) and forward packets appropriately to a destination in a network (e.g., host 14(n)) or a destination out of network (e.g., external host 16(1)). The term "leaf switch" is inclusive of routers, switches, and such other network elements with packet routing, bridging, and switching functionalities that are connected to one or more hosts (e.g., hosts 14). The term "border leaf switch" is inclusive of routers, switches, and such other network elements with packet routing, bridging, and switching functionalities that are connected to external entities, such as one or more external hosts (e.g., external hosts 16). The term "fabric spine" and/or "spine switch" is inclusive of routers, switches, and such other network elements with packet routing, bridging, and switching functionalities that connect one or more leaf switches (e.g., leaf switches 20) and/or one or more border leaf switches (e.g., border leaf switches 22). Further, the term "leaf"/"border leaf" and "spine" are used merely to distinguish between two layers of switches in the network architecture depicted in FIG. 1, and are not meant to be limitations. In a general sense, a "leaf"/"border leaf" switch differs from a "spine" switch by being configured to anchor hosts 14/external hosts 16 to network 12, and a "border leaf" switch differs from a "leaf" switch by being configured to anchor external entities (e.g., external hosts 16) to network 12. In various embodiments, spine switches may be referred to as aggregation switches, and leaf switches 20 and border leaf switches 22 may be referred to as access (or edge) switches in an access/aggregation network topology. Furthermore, as used herein, the term "network element" can encompass computers, network appliances, servers, routers, switches, gateways, bridges, load balancers, firewalls, processors, modules, or any other suitable device, component, element, or object operable to exchange information in a network environment, such as communication system 10. Moreover, the network elements may include any suitable hardware, software, components, modules, interfaces, or objects that facilitate the operations thereof. This may be inclusive of appropriate algorithms and communication protocols that allow for the effective exchange of data or information.

Communication system 10 can include a network topology configured to include any number of servers, virtual machines, switches, routers, and other network nodes interconnected to form network 12. Network elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of Transmission Control Protocol/Internet Protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Furthermore, the exemplary network environment may be configured over a physical infrastructure that includes one or more networks and, further, can be configured in any form including, but not limited to, local area networks (LANs), wireless local area networks (WLANs), virtual local area networks (VLANs), metropolitan area networks (MANs), wide area networks (WANs), virtual private networks (VPNs), Internet, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Figure 2A:
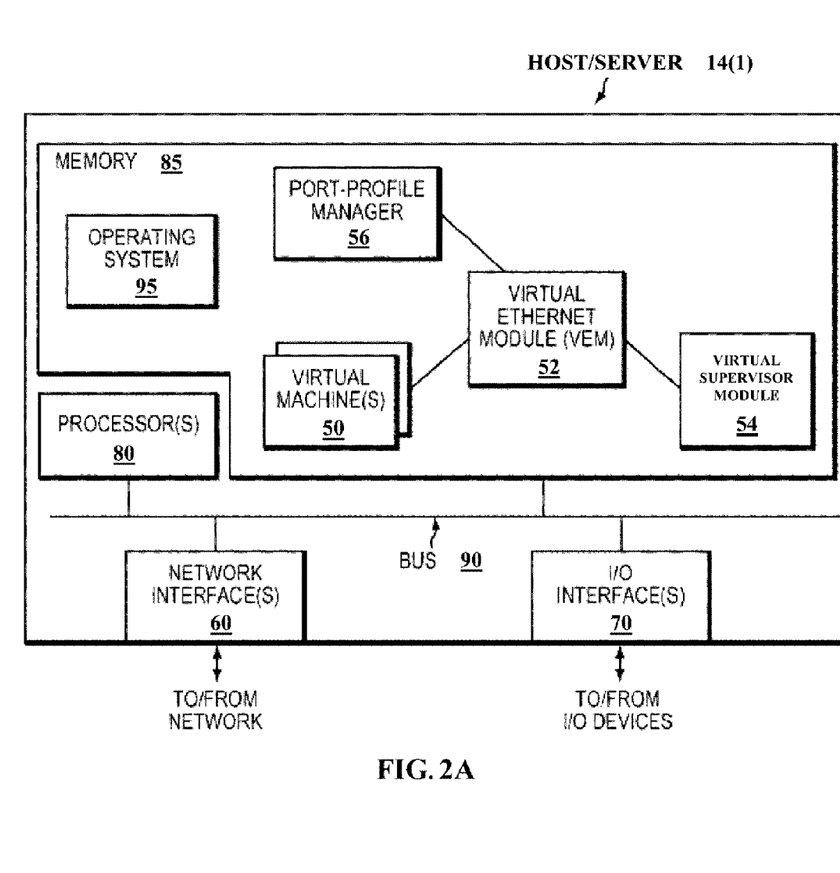
FIG. 2A is a simplified block diagram illustrating example details of the communication system in accordance with various embodiments.
Figure 2B:
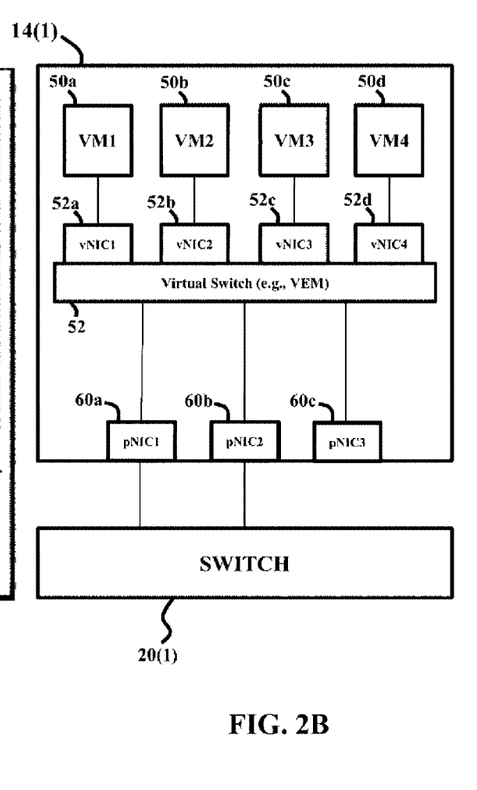
FIG. 2B is a simplified block diagram illustrating example details of the communication system in accordance with various embodiments.

FIG. 2A and FIG. 2B are simplified block diagrams illustrating an exemplary host, such as host 14(1), of communication system 10. In various implementations, host 14(1) is a physical network element, such as a server. Virtual machines (VMs) 50 can run on host 14(1) without interfering with each other, such that multiple operating systems and/or applications can execute concurrently on host 14(1). In FIG. 2B, a virtual machine 50a (VM1), a virtual machine 50b (VM2), a virtual machine 50c (VM3), and a virtual machine 50d (VM4) are depicted as running on host 14(1). Virtual machines 50 can be provided with computing, storage, and networking services for running application workloads. An "application workload" as used herein can be inclusive of an executable file comprising instructions that can be understood and processed on a computer, and may further include library modules loaded during execution, object files, system files, hardware logic, software logic, or any other executable modules. In various implementations, virtual machines 50 may run on hardware abstraction layers, commonly referred to as a hypervisor, which provide operating system independence for applications served by virtual machines 50. The hypervisor can dynamically allocate hardware resources to virtual machines 50. Any virtual machine 50 can migrate from host 14(1) to another host, such as host 14(n). In various implementations, virtual machines 50 may be moved between hosts 14, across Layer 2 or Layer 3 boundaries, based on traffic patterns, hardware resources, and/or other virtual machine migration criteria.

A virtual switch 52 supports bridging between virtual machines 50 and/or an external bridging environment. For example, in the depicted embodiment, host 14(1) is provisioned with a Virtual Ethernet Bridge, such as a Virtual Ethernet Module (VEM), for providing network capability to virtual machines 50. In some implementations, virtual switch 52 may be a part of a distributed virtual switch (DVS) that can span hosts 14 having virtual machines running thereon, where the distributed virtual switch functions as a virtual switch across associated hosts 14 in network 12. A virtual supervisor module (VSM) 54 can be provisioned for providing control plane functionality for virtual machines 50, for example, by controlling virtual switches in in network 12, such as virtual switch 52. Virtual switch 52 can be configured through VSM 54 to perform Layer 2 switching and advanced networking functions, such as port-channels, quality of service (QoS), security (for example, private virtual local area network (VLAN), port security, etc.), and monitoring (for example, Netflow, switch port analyzer (SPAN), encapsulated remote SPAN, etc.). A port profile manager 56 can be provisioned for managing port profiles, where each port profile is configured for application to one or more network interfaces associated with providing virtual machines 50 network capability. Virtual switch 52 and/or VSM 54 can define each port profile, for example, based on port configuration policies, which may include switchport mode, VLAN and PVLAN settings, access control list filter assignments, flow monitors, auto port-channel creation (adds port as a member of a port channel interface), QoS service policy, port security, NetFlow collection, ACL redirect, rate limiting, remote port mirror, or any other configuration attribute that may be applied to a port. Configuration commands for port profiles may include, for example, port profile creation/deletion, virtualization management platform (VMWARE) port group (specifies port group to be created), port profile state (enabled/disabled), port profile capability (marks a port profile to be used for Ethernet (physical/uplink) interfaces), inherit port profile (sets up the inheritance between a parent port profile and a child port profile), port management configuration (port admin status, switchport mode), VLAN and PVLAN configuration, port channel configuration, override port profile configuration, NetFlow configuration, ACL configuration, QoS configuration, port security configuration, and show commands.

Host 14(1) further includes a network interface 60 that enables communication between host 14(1) and other network elements, such as hosts 14, external hosts 16, and/or switches in network 12 (for example, leaf switch 20(1)). Network interface 60 can include mechanical, electrical, and signaling circuitry for communicating data over physical links connected to network 12 (for example, to leaf switch 20(1)). Network interface 60 may be configured to transmit and/or receive data using a variety of different communication protocols over physical links or wireless links. Network interface 60 may also be used to implement a virtual network interface, such as for VPN access or VLANs. In FIG. 2B, host 14(1) includes physical network interfaces, such as a physical network interface card 60a (pNIC1), a physical network interface card 60b (pNIC2), and a physical network interface card 60c (pNIC3). Host 14(1) can communicate upstream to a network fabric, such as network 12, via physical network interface cards 60a, 60b, and/or 60c. In the present example, physical network interface cards 60a, 60b, and/or 60c can communicatively connect host 14(1) to leaf switch 20(1). Each physical network interface card 60a, 60b, and 60c may include one or more Ethernet ports, which can physically connect host 14(1) to various network elements, including leaf switch 20(1). Virtual machines 50 may have associated virtual network interface cards (vNICs), which virtual switch 52 associates with network interface 60. For example, in FIG. 2B, virtual machine 50a has an associated virtual network interface card 52a (vNIC1), virtual machine 50b has an associated virtual network interface card 52b (vNIC2), virtual machine 50c has an associated virtual network interface card 52c (vNIC3), and virtual machine 50d has an associated virtual network interface card 52d (vNIC4). Virtual network interface cards 52a, 52b, 52c, 52d can be mapped to a physical port, such as an Ethernet port, associated with host 14(1) and a virtual port, such as a virtual Ethernet port, associated with virtual switch 52, such that virtual network interface cards 52a, 52b, 52c, 52d are each associated with a physical network interface that connects virtual machines 50 to network 12 and a virtual network interface. In FIG. 2B, physical network interface cards 60a, 60b, and/or 60c may represent uplinks or uplink ports, which represent the physical network interfaces that connect one or more virtual machines 50 to network 12 (in the present example, to leaf switch 20(1)). In various implementations, host 14(1), virtual switch 52, and/or VSM 54 can map a port profile to each physical network interface. For example, host 14(1) can configure a physical network interface as an uplink network interface for forwarding network traffic from virtual machines 50 to network 12. In various implementations, a port channel can be implemented that aggregates multiple physical network interfaces (such as more than one Ethernet port associated with physical network interface cards 60a, 60b, and/or 60c) to create a logical physical interface (or logical port). Such port channel can be defined or managed by port profile manager 56.

Host 14(1) can further include an input/output (I/O) interface(s) 70, a processor 80, and a memory 85. Network interface 60, I/O interface 70, processor 80, and memory 85 can be interconnected by a bus 90. I/O interface 70 can include mechanical, electrical, and signaling circuitry for communicating data between one or more I/O devices, such as a keyboard, a display, a mouse, speakers, and/or other I/O device. I/O interface 70 may receive input from an external source, such as a user (for example, via a user interface), and may communicate an output to the external source (for example, by display, sounds, or other mechanism). Processor 80 can include any necessary elements or logic adapted to execute software programs and processes and manipulate data. Memory 85 can store software programs and data associated with embodiments described herein. An operating system 95, portions of which may be resident in memory 85 and executed by the processor 80, can functionally organize host 14(1), invoking network operations in support of software processes and/or services executing on the device. Other types of processors and memory, including various computer-readable media, may be used to store and execute program instructions pertaining to uplink network interface detection and configuration mechanisms described herein.

Network elements in communication system 10 can implement Virtual Station Interface (VSI) Discovery and Configuration Protocol (VDP) for automatically discovering virtual machines. VDP implements IEEE standard 802.1Qbg/D2.2 (Edge Virtual Bridging), which defines how hosts can exchange virtual link information with switches. EVB can bridge the gap between physical and virtual network resources, simplifying network management by providing a standards-based protocol that defines how virtual bridges (for example, virtual Ethernet bridges (VEBs), such as VEM 52) exchange configuration information. Network elements running VDP can detect and signal the presence of virtual machines (such as virtual machines 50) and exchange capability with an adjacent VDP-capable bridge. For example, VDP can serve as a reliable first-hop protocol and communicate a presence of virtual machines (for example, virtual machines 50 running on host 14(1)) to adjacent leaf nodes (for example, leaf switch 20(1)). In addition to detecting virtual machines when hosts 14 attach (connect) to network 12 (for example, by gleaning identification information, such as media access control (MAC) addresses and Internet Protocol (IP) addresses, associated with the virtual machines), or detecting virtual machine mobility events, VDP triggers auto-configuration of switches (for example, leaf switches 20 and/or border leaf switches 22) in network 12 to ensure network 12 is configured for communicating virtual machine traffic. In various implementations, hosts 14, external hosts 16, leaf switches 20, border leaf switches 22, and/or fabric spine 24 can implement VDP for automatically discovering virtual machines, such as virtual machines 50, in network 12. For example, host 14(1) can implement VDP to communicate to leaf switch 20(1) creation and deletion of virtual machines 50 running thereon, such that each virtual machine's reachability can be advertised to network 12.

Network elements in communication system 10 can implement a neighbor discovery protocol, such as Link Layer Discovery Protocol (LLDP), for communicating their identity, network capabilities (for example, virtual bridging capabilities, such as EVB capabilities), and/or neighboring network elements. Generally, LLDP is a neighbor discovery protocol that network elements can use to advertise information about themselves to other network elements in communication system 10. LLDP can run over the data link layer, allowing network elements running different network layer protocols to learn about each other. In various implementations, when implementing LLDP, network elements can use discovery packets for communicating their associated network capabilities. As used herein, the term "discovery packets" encompasses any suitable link layer (for example, data link layer in Layer 2) network protocol data packets that include information associated with a sender of the discovery packet. LLDP supports a set of attributes that it uses to discover neighbor network elements. These attributes contain type, length, and value descriptions, often referred to as TLVs. LLDP supported network elements can use TLVs to receive and send information to their neighbors. Details such as configuration information, device capabilities, and device identity can thus be advertised using LLDP. For example, LLDP includes an EVB TLV that advertises the network element's EVB capabilities. The EVB TLV includes an EVB mode field that indicates (signifies) whether the network element is an EVB Bridge or an EVB Station. A network element having virtual bridging capabilities (which can mean the network element runs VDP), such as a switch, will advertise its EVB mode as EVB Bridge, whereas a network element that does not have virtual bridging capabilities, such as a server, will advertise its EVB mode as EVB Station. In various implementations, hosts 14, external hosts 16, leaf switches 20, and/or border leaf switches 22 can implement LLDP to negotiate EVB capabilities. For example, when host 14(1) connects to network 12 via leaf switch 20(1), host 14(1) and leaf switch 20(1) can communicate their EVB capabilities to one another using LLDP. If both host 14(1) and leaf switch 20(1) are EVB capable, then VDP negotiation can happen between host 14(1) and leaf switch 20(1), ensuring that leaf switch 20(1) can automatically discover virtual machines in network 12, such as those running on host 14(1). Though LLDP protocol will be described herein to illustrate features of communication system 10, the present disclosure contemplates any neighbor discovery protocol to accomplish the features of communication system 10 described herein, including Cisco Discovery Protocol (CDP), Extreme Discovery Protocol (EDP), Foundry Discovery Protocol (FDP), Nortel Discovery Protocol (NDP), SynOptics Network Management Protocol (SONMP), or other neighbor discovery protocol.

For purposes of illustrating the techniques of communication system 10, it is important to understand the communications in a given system such as the architecture shown in FIG. 1, FIG. 2A, and FIG. 2B. The following foundational information may be viewed as a basis from which the present disclosure may be properly explained. Such information is offered earnestly for purposes of explanation only and, accordingly, should not be construed in any way to limit the broad scope of the present disclosure and its potential applications.

Today's cloud is often powered by a large number of servers (for example, hundreds or thousands) hosting virtual machines. Each server (such as host 14) is connected to the cloud via a network fabric (such as network 12). As each server connects to the network fabric (for example, each time a host 14 attaches to network 12 via a respective leaf switch 20), uplink ports associated with the server need to be configured to run VDP, ensuring that physical network interfaces are provisioned for connecting the server's hosted virtual machines to the cloud. For example, for each server, an uplink network interface needs to be identified and configured to run VDP, and a virtual switch (such as virtual switch 52) and/or virtual supervisor module (such as VSM 54) needs uplink port information to ensure that virtual machines running on the server can communicate with a VEB established to provide the virtual machines connectivity to the network fabric. For example, uplink port information, which includes a port profile associated with the uplink port, is needed to configure (program) flows needed for passing network traffic. Currently, a network administrator and/or a switch (such as leaf switches 20) can manually specify or configure a server's uplink ports. Manually specifying servers' uplink ports is often cumbersome, particularly since cloud and data center environments continue to scale ever larger. For example, a data center having a network fabric that includes one thousand leaf switches 20, where each leaf switch 20 has sixteen host ports for connecting to servers, can have as many as 16,000 uplink ports to configure. Manually configuring uplink ports at such scale is often an error-prone process, which has been evidenced even in a lab environment where only a small number of servers are connected to the network fabric. Alternatively, each server can run a script that configures its uplink ports, in which case, uplink ports need to be the same across all servers connected to the network fabric (in other words, servers must be wired uniformly). However, mis-cabling in data center environments is common, and when a server's uplink ports change, manual configuration will still be necessary to re-configure the server's uplink ports. Although a cloud orchestrator can be implemented to make cloud management easier in these respects, deploying servers in a cloud environment to be connected to the network fabric presents a daunting task when accounting for server uplink port configuration tasks.

Communication system 10 is configured to address the issues described above (and others) in offering a system and method for automatically detecting and configuring server uplink network interfaces in a network environment, such as a cloud computing environment. Embodiments of communication system 10 use existing protocols, which can run in all servers, for providing a touchless mechanism for automatically detecting and configuring server uplink ports. Server uplink port detection and configuration mechanisms described herein can be implemented across different network topologies, such as Virtual Port Channel (VPC) and/or VPC+, and avoid common connection errors that result from manually configuring server uplink ports deployed in today's cloud. For example, server uplink port detection and configurations mechanisms described herein can eliminate any wiring uniformity requirements among servers, remove restrictions imposed on network administrators as to which uplink ports to use, and/or automatically detect uplink port changes. Different embodiments may have different advantages than described herein, and no particular advantage is necessarily required of any of the embodiments described herein.

Returning to FIG. 1, FIG. 2A, and FIG. 2B, communication system 10 uses existing discovery protocols running on its network elements, such as LLDP and VDP, to automatically detect and configure server uplink ports. In various implementations, hosts 14 can determine whether a network element has virtual bridging capabilities (for example, VDP or EVB capabilities) using information gleaned from discovery packets exchanged using a neighbor discovery protocol (for example, LLDP), and configure network interfaces on which discovery packets indicating virtual bridging capabilities are received as uplink ports. Consider when host 14(1) connects (attaches) to network fabric 12. Host 14(1) can connect to network 12 via leaf switch 20(1) when a physical port of physical network interface card 60*a* (such as an Ethernet port) is connected to a host port of leaf switch 20(1). When host 14(1) and leaf switch 20(1) implement a neighbor discovery protocol, such as LLDP described above, host 14(1) automatically discovers its neighbors when connected to leaf switch 20(1). For example, host 14(1) receives discovery packets from network elements associated with network 12 on physical network interface card 60(*a*). Host 14(1) can evaluate the discovery packets to learn identities, network capabilities, and/or other attributes associated with neighboring network elements. In various implementations, host 14(1) can evaluate a discovery packet to determine a network element's virtual bridging capabilities. When a discovery packet indicates that its associated network element has virtual bridging capabilities, host 14(1) can configure a network interface on which the discovery packet was received as an uplink network interface, or an uplink port. More specifically, as described above, a network element's LLDP discovery packet will include an EVB TLV that advertises the network element's EVB capabilities, and the EVB TLV includes an EVB mode field that indicates (signifies) whether the network element is an EVB Bridge or an EVB Station. When host 14(1) examines the EVB mode field of an LLDP discovery packet and discovers that the EVB mode field is set to EVB Bridge, host 14(1) knows that its network interface is connected to a network element, such as a switch, possessing virtual bridging capabilities. Host 14(1) can thus classify the network interface connected to the network element as an uplink network interface (uplink port). For example, when host 14(1) receives an LLDP discovery packet from leaf switch 20(1) on physical network interface card 60(a), host 14(1) will discover that the EVB mode field is set to EVB Bridge, meaning that leaf switch 20(1) possesses virtual bridging capabilities. Host 14(1) can then configure physical network interface card 60(a) as an uplink port, and host 14(1) can forward network traffic from virtual machines 50 running thereon via the uplink port to network 12. Host 14(1) can also automatically detect and reconfigure its uplink network interface upon detecting that the uplink interface associated with physical network interface card 60(a) is broken. For example, in various implementations, assuming physical network interface card 60(a) is disconnected from leaf switch 20(1), host 14(1) can automatically reconfigure its uplink interface by discovering another physical network interface card attached to leaf switch 20(1) or when it receives a discovery packet from leaf switch 20(1) upon being re-connected to leaf switch 20(1). Such uplink detection and configuration mechanism can be accomplished without adding any TLV or sub-TLV extension to existing neighbor discovery protocol packets. Further, such uplink detection and configuration mechanism can significantly reduce, or even eliminate, any manual configuration required for provisioning server uplink ports. This can work for a physical network interface, such as physical network interface card 60(a), or when multiple physical network interfaces of host 14(1) (such as physical network interface card 60(a) and physical network interface card 60(b)) are bundled as a logical physical network interface. Furthermore, such uplink detection and configuration mechanism can work across different network topologies. For example, in FIG. 1, where one of the hosts 14 is connected to another host 14 via a physical network interface depicted as eth0 and to leaf switch 20(m) via a physical network interface depicted as eth 5, the uplink detection and configuration mechanism described herein will detect and configure physical network interface depicted as eth 5 as an uplink port, not the physical network interface depicted as eth 0, which is between hosts.

Figure 3:
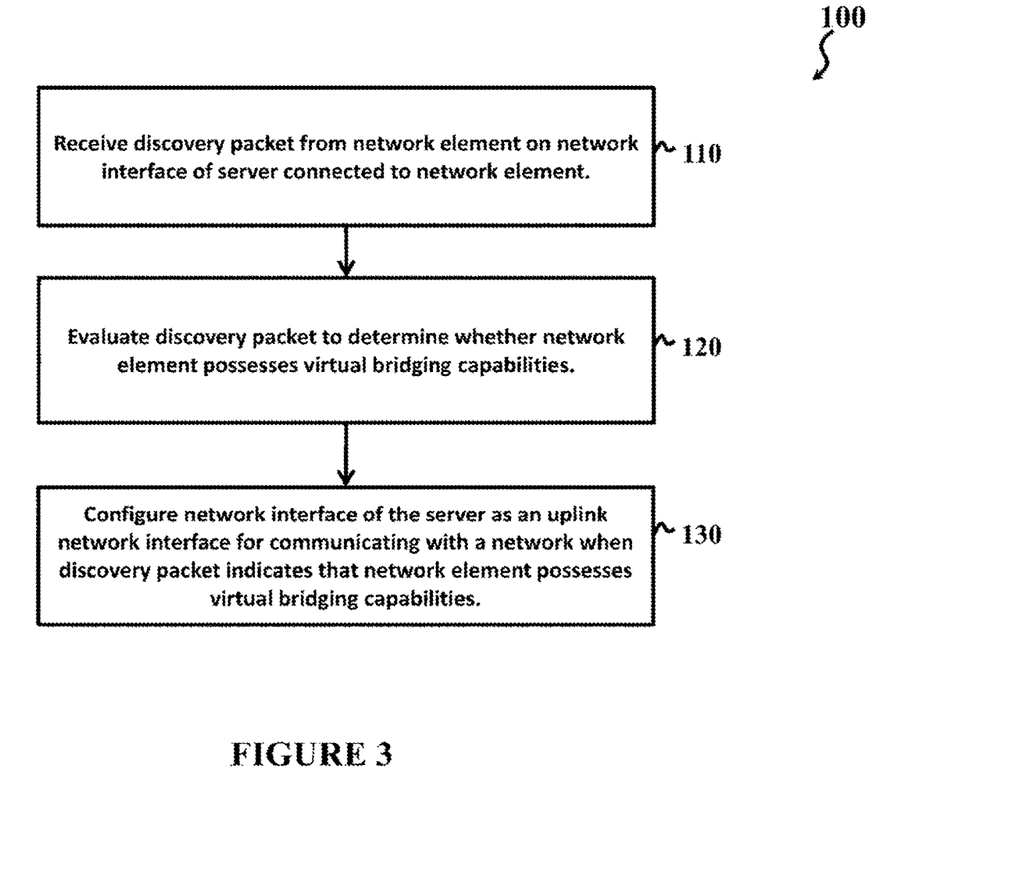
FIG. 3 is a simplified flow diagram illustrating example operations that can be associated with various embodiments of the communication system.

Turning to FIG. 3, FIG. 3 is a simplified flow diagram illustrating example operations 100 that may be associated with various embodiments of communication system 10. At block 110, a discovery packet is received from a network element on a network interface of a server connected to the network element. For example, in various implementations, the server receives an LLDP packet from a network element on a network interface, such as a physical network interface card. At block 120, the discovery packet is evaluated to determine whether the network element possesses virtual bridging capabilities. For example, in various implementations, the server determines whether an EVB mode field of the LLDP packet is set to EVB Bridge, indicating that the network element supports VDP. At block 130, the network interface of the server is configured as an uplink interface for communicating with a network when the discovery packet indicates that the network element possesses virtual bridging capabilities. For example, in various implementations, when the server determines that the EVB mode field is set to EVB bridge, the server knows that the network element is a switch running VDP. The server can then automatically configure the network interface as the uplink port, and forward network traffic from virtual machines running thereon via the network interface.

In example implementations, at least some portions of the activities outlined herein may be implemented in software in, for example, hosts 14, external hosts 16, leaf switches 20, border leaf switches 22, and/or fabric spine 24. In some embodiments, one or more of these features may be implemented in hardware, provided external to these elements, or consolidated in any appropriate manner to achieve the intended functionality. Various network elements described herein (for example, hosts 14, external hosts 16, leaf switches 20, border leaf switches 22, and/or fabric spine 24) may include software (or reciprocating software) that can coordinate in order to achieve the operations as outlined herein. In still other embodiments, these elements may include any suitable algorithms, hardware, software, components, modules, interfaces, or objects that facilitate the operations thereof. Furthermore, hosts 14, external hosts 16, leaf switches 20, border leaf switches 22, and/or fabric spine 24 described and shown herein (and/or associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some example embodiments, one or more memory elements can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, a processor can transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA)), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored could be provided in any database, register, table, cache, queue, control list, or storage structure, based on particular needs and implementations, all of which could be referenced in any suitable timeframe. Any of the memory items discussed herein should be construed as being encompassed within the broad term "memory element." Similarly, any of the potential processing elements, modules, and machines described herein should be construed as being encompassed within the broad term "processor."

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", "various implementations" and the like are intended to mean that any such features are included in one or more embodiments of the present disclosure, but may or may not necessarily be combined in the same embodiments.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of the communication system 10 as described herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a link layer discovery protocol packet (LLDP) from a network element on a network interface of a server connected to the network element;
   indicating, by the server in response to the received LLDP including an Ethernet Virtual Bridging (EVB) Type-Length-Value (TLV), that the network element is an EVB Bridge;
   automatically configuring, in response to the indicating the network element is an EVB Bridge, the network interface as an uplink interface to run virtual station interface (VSI) Discovery and Configuration Protocol (VDP) for communicating with a network.

2. The method of claim 1, further comprising forwarding network traffic from a virtual machine running on the server via the uplink interface to the network.

3. The method of claim 1, wherein the network element is a switch, the method further comprising receiving the LLDP upon connecting the network interface of the server to the switch.

4. The method of claim 3, wherein the uplink interface is associated with a physical port of the server attached to the switch.

5. The method of claim 3, wherein the uplink interface is associated with a logical port of the server attached to the switch.

6. The method of claim 1, further comprising, in response to detecting that the uplink interface for communicating with the network is broken, automatically detecting and reconfiguring the uplink interface for the server connected with the network element.

7. The method of claim 6, further comprising automatically reconfiguring the uplink interface in response to the server reconnecting to the network element.

8. A non-transitory computer readable media including instructions to cause a computer to execute operations comprising:
   receiving a link layer discovery protocol packet (LLDP) from a network element on a network interface of a server connected to the network element;
   indicating, by the server in response to the received LLDP including an Ethernet Virtual Bridging (EVB) Type-Length-Value (TLV), that the network element is an EVB Bridge;
   automatically configuring, in response to the indicating the network element is an EVB Bridge, the network interface as an uplink interface to run virtual station interface (VSI) Discovery and Configuration Protocol (VDP) for communicating with a network.

9. The media of claim 8, the operations further comprising forwarding network traffic from a virtual machine running on the server via the uplink interface to the network.

10. The media of claim 8, wherein the network element is a switch, the operations further comprising receiving the LLDP upon connecting the network interface of the server to the switch.

11. The media of claim 10, wherein the uplink interface is associated with a physical port of the server attached to the switch.

12. The media of claim 10, wherein the uplink interface is associated with a logical port of the server attached to the switch.

13. The media of claim 8, the operations further comprising, in response to detecting that the uplink interface for communicating with the network is broken, automatically detecting and reconfiguring the uplink interface for the server connected with the network element.

14. The media of claim 13, the operations further comprising automatically reconfiguring the uplink interface in response to the server reconnecting to the network element.

15. A system, comprising:
 a memory;
 a processor configured to cooperate with the memory to perform operations comprising:
  receiving a link layer discovery protocol packet (LLDP) from a network element on a network interface of a server connected to the network element;
  indicating, by the server in response to the received LLDP including an Ethernet Virtual Bridging (EVB) Type-Length-Value (TLV), that the network element is an EVB Bridge;
  automatically configuring, in response to the indicating the network element is an EVB Bridge, the network interface as an uplink interface to run virtual station interface (VSI) Discovery and Configuration Protocol (VDP) for communicating with a network.

16. The system of claim 15, the operations further comprising forwarding network traffic from a virtual machine running on the server via the uplink interface to the network.

17. The system of claim 15, wherein the network element is a switch, the operations further comprising receiving the LLDP upon connecting the network interface of the server to the switch.

18. The system of claim 17, wherein the uplink interface is associated with a physical port of the server attached to the switch.

19. The system of claim 17, wherein the uplink interface is associated with a logical port of the server attached to the switch.

20. The system of claim 15, the operations further comprising, in response to detecting that the uplink interface for communicating with the network is broken, automatically detecting and reconfiguring the uplink interface for the server connected with the network element.

* * * * *